United States Patent
Armstrong

(10) Patent No.: US 8,432,456 B2
(45) Date of Patent: Apr. 30, 2013

(54) DIGITAL CAMERA FOR SHARING DIGITAL IMAGES

(75) Inventor: Frank W. Armstrong, Rochester, NY (US)

(73) Assignee: Apple Inc., Cupertino, CA (US)

(*) Notice: Subject to any disclaimer, the term of this patent is extended or adjusted under 35 U.S.C. 154(b) by 322 days.

(21) Appl. No.: 12/818,200

(22) Filed: Jun. 18, 2010

(65) Prior Publication Data
US 2011/0310257 A1 Dec. 22, 2011

(51) Int. Cl.
*H04N 5/232* (2006.01)
*H04N 5/225* (2006.01)

(52) U.S. Cl.
USPC ............. 348/211.99; 348/207.11; 348/153; 348/143; 725/105

(58) Field of Classification Search ............ 348/211.3, 348/211.1, 211.99, 207.1, 207.11
See application file for complete search history.

(56) References Cited

U.S. PATENT DOCUMENTS

| | | | |
|---|---|---|---|
| 3,971,065 A | 7/1976 | Bayer | |
| 4,642,678 A | 2/1987 | Cok | |
| 4,774,574 A | 9/1988 | Daly et al. | |
| 5,189,511 A | 2/1993 | Parulski et al. | |
| 5,493,335 A | 2/1996 | Parulski et al. | |
| 5,652,621 A | 7/1997 | Adams, Jr. et al. | |
| 5,668,597 A | 9/1997 | Parulski et al. | |
| 6,192,162 B1 | 2/2001 | Hamilton, Jr. et al. | |
| 6,292,218 B1 | 9/2001 | Parulski et al. | |
| 6,574,588 B1 * | 6/2003 | Shapiro et al. | 703/24 |
| 6,934,056 B2 | 8/2005 | Gindele et al. | |
| 7,542,077 B2 | 6/2009 | Miki | |
| 7,668,986 B2 * | 2/2010 | Lowe et al. | 710/62 |
| 7,724,281 B2 * | 5/2010 | Vale et al. | 348/207.1 |
| 2003/0210331 A1 * | 11/2003 | Battles et al. | 348/211.2 |
| 2004/0090543 A1 | 5/2004 | Suehiro | |
| 2004/0201688 A1 * | 10/2004 | Wolf et al. | 348/207.1 |
| 2005/0191729 A1 | 9/2005 | Kaczmarek et al. | |
| 2006/0279642 A1 * | 12/2006 | Yoneda | 348/231.1 |
| 2008/0276012 A1 * | 11/2008 | Mesa et al. | 710/13 |
| 2009/0091626 A1 | 4/2009 | Kaplan et al. | |

FOREIGN PATENT DOCUMENTS

| | | |
|---|---|---|
| WO | 98/50861 | 11/1998 |
| WO | 2009/157500 | 12/2009 |

* cited by examiner

*Primary Examiner* — Hung Lam
(74) *Attorney, Agent, or Firm* — Wong, Cabello, Lutsch, Rutherford & Brucculeri LLP

(57) ABSTRACT

A digital camera capable of sharing digital images using a plurality of host computers, comprising: memory for storing captured digital images and for storing installation software that can be used to install digital image sharing software on the plurality of host computers; a user interface for designating captured digital images to be shared; and a communication interface for communicating with a host computer. The communication interface can be configured to use a first logical protocol where the digital camera appears to the host computer as a data storage device in order to install the digital image sharing software on the host computer. A second logical protocol, where the digital camera appears to the host computer as an image capture device, is used when the digital image sharing software is running on the host computer that enables the digital image sharing software to automatically share designated digital images.

18 Claims, 5 Drawing Sheets

DIGITAL CAMERA FOR SHARING DIGITAL IMAGES

FIELD OF THE INVENTION

This invention relates to digital cameras that capture digital images, and, more particularly to digital cameras capable of automatically installing software for transferring and sharing digital images on multiple host computers.

BACKGROUND OF THE INVENTION

Digital cameras are used by a growing number of consumer and professional photographers to capture and share pictures and videos. These cameras typically use one or more CCD or CMOS image sensors to capture images. The captured images are digitally processed to produce digital image files that are stored in a digital memory in the camera, typically on a removable memory card. These digital image files can then be transferred to a host computer where they can be shared, for example via E-mail or social networking websites.

Some digital cameras provide a user interface where a user can designate certain captured digital images for sharing. Typically, the user is allowed to designate one or more destinations (recipients) for the shared digital images. The designated destinations can include E-mail addresses, picture sharing websites, social networking websites or digital picture frames. To support this feature, digital image sharing software can be installed on the host computer to automatically perform file transfers and sharing operations according to the designated sharing destinations recorded in the digital camera. The digital image sharing software and digital camera interact to complete the file transfers and sharing operations when the digital camera is connected to the host computer.

The principle shortcomings in the above interaction is that the digital image sharing software must be installed on the host computer prior to the digital camera connection. Typically, the digital image sharing software can be installed using installation disks supplied with the digital camera or can be downloaded from a website.

Some recent digital cameras have been provided with a capability to automatically initiate the installation of the photo sharing software the first time the digital camera is connected to a host computer. Notably, the KODAK EASY-SHARE M530 Digital Camera incorporates this feature. After the digital camera has initiated installation of the photo sharing software on a host computer, the configuration of the digital camera is altered so that the next time it is connected to a host computer it will connect in a mode where digital images can be transferred from the digital camera to the host. Therefore, if the digital camera is connected to a second host computer, the photo sharing software will not be automatically installed and the user must manually initiate the installation process, thus making it inconvenient to share images using multiple host computers. Therefore, there remains a need for a convenient method to automatically install photo sharing software on multiple host computers.

SUMMARY OF THE INVENTION

The present invention represents a digital camera capable of sharing digital images using a plurality of host computers, comprising:

an imaging sensor;

an optical system for imaging a scene onto the imaging sensor;

an image capture control for initiating an image capture operation;

memory for storing captured digital images and for storing installation software that can be used to install digital image sharing software on the plurality of host computers;

a user interface for designating captured digital images to be shared; and a communication interface for communicating with a host computer, wherein the communication interface can be configured to use a first logical protocol where the digital camera appears to the host computer as a data storage device and a second logical protocol where the digital camera appears to the host computer as an image capture device;

wherein when the digital camera is connected to a host computer the processor causes the communication interface to use the first logical protocol so that the host computer can access the installation software stored in the memory to install the digital image sharing software on the host computer; and wherein when the digital image sharing software is running on the host computer it sends commands to the digital camera to cause the processor to switch the communication interface to use the second logical protocol and subsequently to cause digital images that have been designated for sharing to be transferred to the host computer.

This invention has the advantage that when a digital camera is connected to any host computer that does not have digital image sharing software installed, the installation software runs and the digital camera user can choose to install the digital image sharing software immediately and easily without the need to look for software installation CDs or to take steps to manually install the digital image sharing software from the Internet.

It has the further advantage that the digital image sharing software can be installed on multiple host computers without the need to manually reset digital camera configuration settings.

It has the additional advantage that the digital image sharing software can change the digital camera protocol settings automatically with regard to the user preferences during software installation.

DETAILED DESCRIPTION OF THE INVENTION

Figure 1:
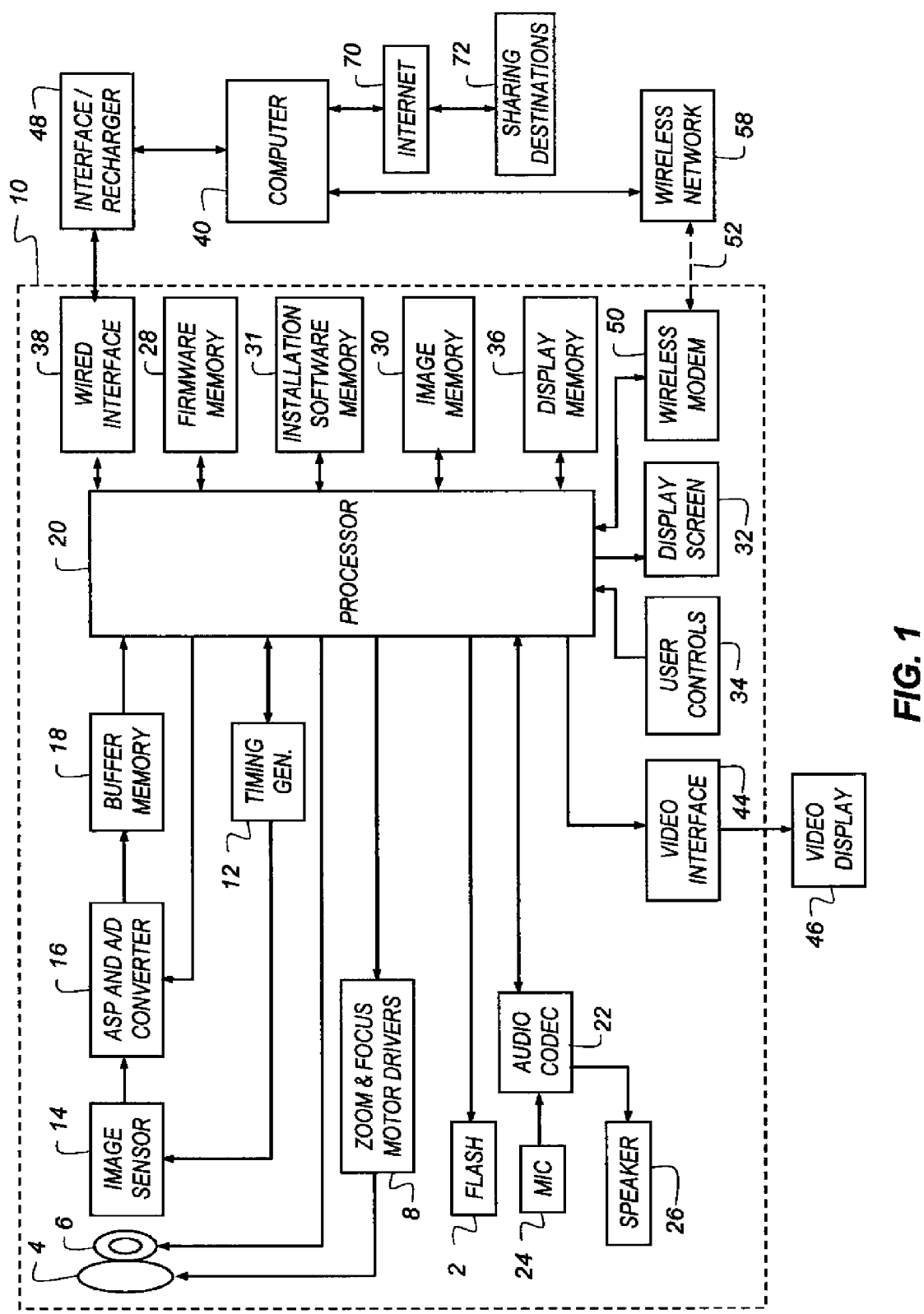
FIG. 1 is a block diagram showing the components of a digital photography system.

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Because digital cameras employing imaging devices and related circuitry for signal capture and processing, and display are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The following description of a digital camera will be familiar to one skilled in the art. It will be obvious that there are many variations of this embodiment that are possible and are selected to reduce the cost, add features or improve the performance of the camera.

FIG. 1 depicts a block diagram of a digital photography system, including a digital camera 10 in accordance with the present invention. Preferably, the digital camera 10 is a portable battery operated device, small enough to be easily handheld by a user when capturing and reviewing images. The digital camera 10 produces digital images that are stored as digital image files using image memory 30. The phrase "digital image" or "digital image file", as used herein, refers to any digital image file, such as a digital still image or a digital video file.

In some embodiments, the digital camera 10 captures both motion video images and still images. The digital camera 10 can also include other functions, including, but not limited to, the functions of a digital music player (e.g. an MP3 player), a mobile telephone, a GPS receiver, or a programmable digital assistant (PDA).

The digital camera 10 includes a lens 4 having an adjustable aperture and adjustable shutter 6. In a preferred embodiment, the lens 4 is a zoom lens and is controlled by zoom and focus motor drives 8. The lens 4 focuses light from a scene (not shown) onto an image sensor 14, for example, a single-chip color CCD or CMOS image sensor. The lens 4 is one type optical system for forming an image of the scene on the image sensor 14. In other embodiments, the optical system may use a fixed focal length lens with either variable or fixed focus.

The output of the image sensor 14 is converted to digital form by Analog Signal Processor (ASP) and Analog-to-Digital (A/D) converter 16, and temporarily stored in buffer memory 18. The image data stored in buffer memory 18 is subsequently manipulated by a processor 20, using embedded software programs (e.g. firmware) stored in firmware memory 28. In some embodiments, the software program is permanently stored in firmware memory 28 using a read only memory (ROM). In other embodiments, the firmware memory 28 can be modified by using, for example, Flash EPROM memory. In such embodiments, an external device can update the software programs stored in firmware memory 28 using the wired interface 38 or the wireless modem 50. In such embodiments, the firmware memory 28 can also be used to store image sensor calibration data, user setting selections and other data which must be preserved when the camera is turned off. In some embodiments, the processor 20 includes a program memory (not shown), and the software programs stored in the firmware memory 28 are copied into the program memory before being executed by the processor 20.

It will be understood that the functions of processor 20 can be provided using a single programmable processor or by using multiple programmable processors, including one or more digital signal processor (DSP) devices. Alternatively, the processor 20 can be provided by custom circuitry (e.g., by one or more custom integrated circuits (ICs) designed specifically for use in digital cameras), or by a combination of programmable processor(s) and custom circuits. It will be understood that connectors between the processor 20 from some or all of the various components shown in FIG. 1 can be made using a common data bus. For example, in some embodiments the connection between the processor 20, the buffer memory 18, the image memory 30, and the firmware memory 28 can be made using a common data bus.

The processed images are then stored using the image memory 30. It is understood that the image memory 30 can be any form of memory known to those skilled in the art including, but not limited to, a removable Flash memory card, internal Flash memory chips, magnetic memory, or optical memory. In some embodiments, the image memory 30 can include both internal Flash memory chips and a standard interface to a removable Flash memory card, such as a Secure Digital (SD) card. Alternatively, a different memory card format can be used, such as a micro SD card, Compact Flash (CF) card, MultiMedia Card (MMC), xD card or Memory Stick.

The image sensor 14 is controlled by a timing generator 12, which produces various clocking signals to select rows and pixels and synchronizes the operation of the ASP and A/D converter 16. The image sensor 14 can have, for example, 12.4 megapixels (4088×3040 pixels) in order to provide a still image file of approximately 4000×3000 pixels. To provide a color image, the image sensor is generally overlaid with a color filter array, which provides an image sensor having an array of pixels that include different colored pixels. The different color pixels can be arranged in many different patterns. As one example, the different color pixels can be arranged using the well-known Bayer color filter array, as described in commonly assigned U.S. Pat. No. 3,971,065, "Color imaging array" to Bayer, the disclosure of which is incorporated herein by reference. As a second example, the different color pixels can be arranged as described in commonly assigned U.S. Patent Application Publication 2007/0024932 published on Feb. 1, 2007 and titled "Image sensor with improved light sensitivity" to Compton and Hamilton, the disclosure of which is incorporated herein by reference. These examples are not limiting, and many other color patterns may be used.

It will be understood that the image sensor 14, timing generator 12, and ASP and A/D converter 16 can be separately fabricated integrated circuits, or they can be fabricated as a single integrated circuit as is commonly done with CMOS image sensors. In some embodiments, this single integrated circuit can perform some of the other functions shown in FIG. 1, including some of the functions provided by processor 20.

The image sensor 14 is effective when actuated in a first mode by timing generator 12 for providing a motion sequence of lower resolution sensor image data, which is used when capturing video images and also when previewing a still image to be captured, in order to compose the image. This preview mode sensor image data can be provided as HD resolution image data, for example, with 1280×720 pixels, or as VGA resolution image data, for example, with 640×480 pixels, or using other resolutions which have fewer columns and rows of data, compared to the resolution of the image sensor.

The preview mode sensor image data can be provided by combining values of adjacent pixels having the same color, or by eliminating some of the pixels values, or by combining some color pixels values while eliminating other color pixel values. The preview mode image data can be processed as described in commonly assigned U.S. Pat. No. 6,292,218 to Parulski, et al., entitled "Electronic camera for initiating capture of still images while previewing motion images," which is incorporated herein by reference.

The image sensor 14 is also effective when actuated in a second mode by timing generator 12 for providing high resolution still image data. This final mode sensor image data is provided as high resolution output image data, which for scenes having a high illumination level includes all of the pixels of the image sensor, and can be, for example, a 12 megapixel final image data having 4000×3000 pixels. At lower illumination levels, the final sensor image data can be provided by "binning" some number of like-colored pixels on the image sensor, in order to increase the signal level and thus the "ISO speed" of the sensor.

The zoom and focus motor drivers 8 are controlled by control signals supplied by the processor 20, to provide the appropriate focal length setting and to focus the scene onto the image sensor 14. The exposure level of the image sensor 14 is controlled by controlling the f/number and exposure time of the adjustable aperture and adjustable shutter 6, the exposure period of the image sensor 14 via the timing generator 12, and the gain (i.e., ISO speed) setting of the ASP and A/D converter 16. The processor 20 also controls a flash 2 which can illuminate the scene.

The lens 4 of the digital camera 10 can be focused in the first mode by using "through-the-lens" autofocus, as described in commonly-assigned U.S. Pat. No. 5,668,597, entitled "Electronic Camera with Rapid Automatic Focus of an Image upon a Progressive Scan Image Sensor" to Parulski et al., which is incorporated herein by reference. This is accomplished by using the zoom and focus motor drivers 8 to adjust the focus position of the lens 4 to a number of positions ranging between a near focus position to an infinity focus position, while the processor 20 determines the closest focus position which provides a peak sharpness value for a central portion of the image captured by the image sensor 14. The focus distance which corresponds to the closest focus position can then be utilized for several purposes, such as automatically setting an appropriate scene mode, and can be stored as metadata in the image file, along with other lens and camera settings.

The processor 20 produces menus and low resolution color images that are temporarily stored in display memory 36 and are displayed on a display screen 32. The display screen 32 is typically an active matrix color liquid crystal display (LCD), although other types of displays, such as organic light emitting diode (OLED) displays, can be used. A video interface 44 provides a video output signal from the digital camera 10 to a video display 46, such as a flat panel HDTV display. In preview mode, or video mode, the digital image data from buffer memory 18 is manipulated by processor 20 to form a series of motion preview images that are displayed, typically as color images, on the display screen 32. In review mode, the images displayed on the display screen 32 are produced using the image data from the digital image files stored in image memory 30.

The graphical user interface displayed on the display screen 32 is controlled in response to user input provided by user controls 34. The user controls 34 are used to select various camera modes, such as video capture mode, still capture mode, and review mode, and to initiate capture of still images and recording of motion images. In some embodiments, the first mode described above (i.e. still preview mode) is initiated when the user partially depresses a shutter button, which is one of the user controls 34, and the second mode (i.e., still image capture mode) is initiated when the user fully depresses the shutter button. The user controls 34 are also used to turn on the digital camera 10, control the lens 4, and initiate the picture taking process. User controls 34 typically include some combination of buttons, rocker switches, joysticks, or rotary dials. In some embodiments, some of the user controls 34 are provided by using a touch screen overlay on the display screen 32. In other embodiments, additional status displays or images displays can be used.

The camera modes that can be selected using the user controls 34 include a "timer" mode. When the "timer" mode is selected, a short delay (e.g., 10 seconds) occurs after the user fully presses the shutter button, before the processor 20 initiates the capture of a still image.

An audio codec 22 connected to the processor 20 receives an audio signal from a microphone 24 and provides an audio signal to a speaker 26. These components can be used to record and playback an audio track, along with a video sequence or still image. If the digital camera 10 is a multi-function device such as a combination camera and mobile phone, the microphone 24 and the speaker 26 can be used for telephone conversation.

In some embodiments, the speaker 26 can be used as part of the user interface, for example to provide various audible signals which indicate that a user control has been depressed, or that a particular mode has been selected. In some embodiments, the microphone 24, the audio codec 22, and the processor 20 can be used to provide voice recognition, so that the user can provide a user input to the processor 20 by using voice commands, rather than user controls 34. The speaker 26 can also be used to inform the user of an incoming phone call. This can be done using a standard ring tone stored in firmware memory 28, or by using a custom ring-tone downloaded from a wireless network 58 and stored in the image memory 30. In addition, a vibration device (not shown) can be used to provide a silent (e.g., non audible) notification of an incoming phone call.

The processor 20 also provides additional processing of the image data from the image sensor 14, in order to produce rendered sRGB image data which is compressed and stored within a "finished" image file, such as a well-known Exif-JPEG image file, in the image memory 30.

The digital camera 10 can be connected via the wired interface 38 to an interface/recharger 48, which is connected to a host computer 40, which can be a desktop computer or portable computer located in a home or office. The wired interface 38 can conform to, for example, the well-known USB 2.0 interface specification. The interface/recharger 48 can provide power via the wired interface 38 to a set of rechargeable batteries (not shown) in the digital camera 10.

The digital camera 10 can include a wireless modem 50, which interfaces over a radio frequency band 52 with the wireless network 58. The wireless modem 50 can use various wireless interface protocols, such as the well-known Bluetooth wireless interface or the well-known 802.11 wireless interface. The host computer 40 can share images via the Internet 70 to sharing destinations 72, such as an E-mail address, a picture sharing website (e.g., Kodak EasyShare Gallery), a social networking website (e.g., Facebook), a digital picture frame, a multimedia message to a cell-phone or a printing service. Other devices (not shown) can access the images stored on the host computer 40, or stored at one of the sharing destinations 72. The sharing destinations 72 can be specified by the user using the user controls 34. Typically, the user is allowed to designate one or more sharing destinations 72 for each digital image captured by the digital camera 10 and stored in the image memory 30.

In alternative embodiments, the wireless modem 50 communicates over a radio frequency (e.g. wireless) link with a mobile phone network (not shown), such as a 3GSM network, which connects with the Internet 70 in order to upload digital image files from the digital camera 10. These digital image files can be provided to the host computer 40 or the sharing destinations 72.

The digital camera 10 also includes an installation software memory 31, which stores installation software (or a portion thereof) that can be used to install digital image sharing software on the host computer 40 according to the present invention. As will be described in more detail later, the installation software memory 31 is configured so that it appears as a CD-ROM to the host computer 40 when the digital camera 10 is initially connected to the host computer 40.

Figure 2:
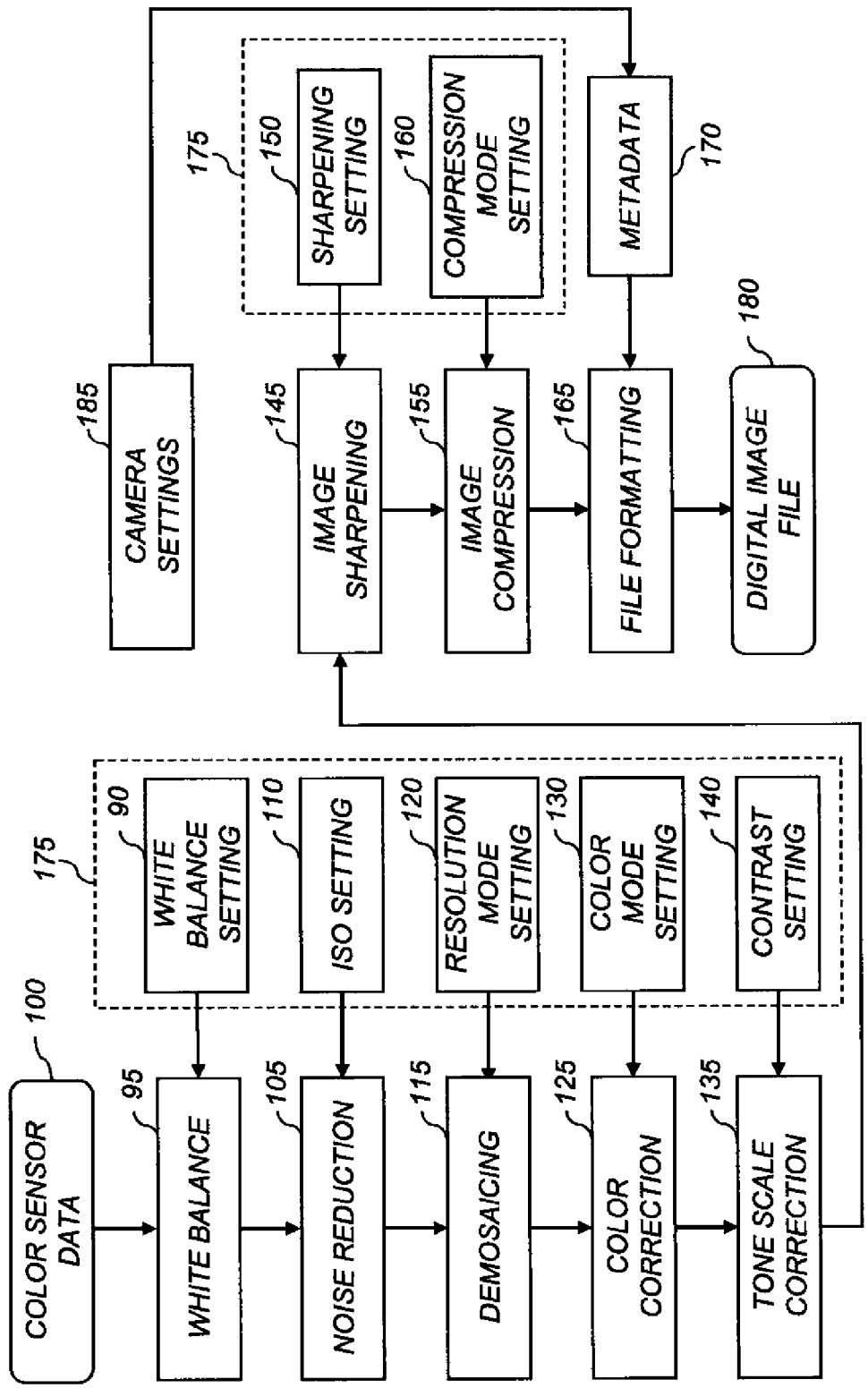
FIG. 2 is a flow diagram depicting typical image processing operations used to process digital images in a digital camera.

FIG. 2 is a flow diagram depicting image processing operations that can be performed by the processor 20 in the digital camera 10 (FIG. 1) in order to process color sensor data 100 from the image sensor 14 output by the ASP and A/D converter 16. In some embodiments, the processing parameters used by the processor 20 to manipulate the color sensor data 100 for a particular digital image are determined by various user settings 175, which can be selected via the user controls 34 in response to menus displayed on the display screen 32.

The color sensor data 100 which has been digitally converted by the ASP and A/D converter 16 is manipulated by a white balance step 95. In some embodiments, this processing can be performed using the methods described in commonly-assigned U.S. Pat. No. 7,542,077 to Miki, entitled "White balance adjustment device and color identification device", the disclosure of which is herein incorporated by reference. The white balance can be adjusted in response to a white balance setting 90, which can be manually set by a user, or which can be automatically set by the camera.

The color image data is then manipulated by a noise reduction step 105 in order to reduce noise from the image sensor 14. In some embodiments, this processing can be performed using the methods described in commonly-assigned U.S. Pat. No. 6,934,056 to Gindele et al., entitled "Noise cleaning and interpolating sparsely populated color digital image using a variable noise cleaning kernel," the disclosure of which is herein incorporated by reference. The level of noise reduction can be adjusted in response to an ISO setting 110, so that more filtering is performed at higher ISO exposure index settings.

The color image data is then manipulated by a demosaicing step 115, in order to provide red, green and blue (RGB) image data values at each pixel location. Algorithms for performing the demosaicing step 115 are commonly known as color filter array (CFA) interpolation algorithms or "deBayering" algorithms. In one embodiment of the present invention, the demosaicing step 115 can use the luminance CFA interpolation method described in commonly-assigned U.S. Pat. No. 5,652,621, entitled "Adaptive color plane interpolation in single sensor color electronic camera," to Adams et al., the disclosure of which is incorporated herein by reference. The demosaicing step 115 can also use the chrominance CFA interpolation method described in commonly-assigned U.S. Pat. No. 4,642,678, entitled "Signal processing method and apparatus for producing interpolated chrominance values in a sampled color image signal", to Cok, the disclosure of which is herein incorporated by reference.

In some embodiments, the user can select between different pixel resolution modes, so that the digital camera can produce a smaller size image file. Multiple pixel resolutions can be provided as described in commonly-assigned U.S. Pat. No. 5,493,335, entitled "Single sensor color camera with user selectable image record size," to Parulski et al., the disclosure of which is herein incorporated by reference. In some embodiments, a resolution mode setting 120 can be selected by the user to be full size (e.g. 3,000×2,000 pixels), medium size (e.g. 1,500×1000 pixels) or small size (750×500 pixels).

The color image data is color corrected in color correction step 125. In some embodiments, the color correction is provided using a 3×3 linear space color correction matrix, as described in commonly-assigned U.S. Pat. No. 5,189,511, entitled "Method and apparatus for improving the color rendition of hardcopy images from electronic cameras" to Parulski, et al., the disclosure of which is incorporated herein by reference. In some embodiments, different user-selectable color modes can be provided by storing different color matrix coefficients in firmware memory 28 of the digital camera 10. For example, four different color modes can be provided, so that the color mode setting 130 is used to select one of the following color correction matrices:

Setting 1 (Normal Color Reproduction)

$$\begin{bmatrix} R_{out} \\ G_{out} \\ B_{out} \end{bmatrix} = \begin{bmatrix} 1.50 & -0.30 & -0.20 \\ -0.40 & 1.80 & -0.40 \\ -0.20 & -0.20 & 1.40 \end{bmatrix} \begin{bmatrix} R_{in} \\ G_{in} \\ B_{in} \end{bmatrix} \quad (1)$$

Setting 2 (Saturated Color Reproduction)

$$\begin{bmatrix} R_{out} \\ G_{out} \\ B_{out} \end{bmatrix} = \begin{bmatrix} 2.00 & -0.60 & -0.40 \\ -0.80 & 2.60 & -0.80 \\ -0.40 & -0.40 & 1.80 \end{bmatrix} \begin{bmatrix} R_{in} \\ G_{in} \\ B_{in} \end{bmatrix} \quad (2)$$

Setting 3 (De-Saturated Color Reproduction)

$$\begin{bmatrix} R_{out} \\ G_{out} \\ B_{out} \end{bmatrix} = \begin{bmatrix} 1.25 & -0.15 & -0.10 \\ -0.20 & 1.40 & -0.20 \\ -0.10 & -0.10 & 1.20 \end{bmatrix} \begin{bmatrix} R_{in} \\ G_{in} \\ B_{in} \end{bmatrix} \quad (3)$$

Setting 4 (Monochrome)

$$\begin{bmatrix} R_{out} \\ G_{out} \\ B_{out} \end{bmatrix} = \begin{bmatrix} 0.30 & 0.60 & 0.10 \\ 0.30 & 0.60 & 0.10 \\ 0.30 & 0.60 & 0.10 \end{bmatrix} \begin{bmatrix} R_{in} \\ G_{in} \\ B_{in} \end{bmatrix} \quad (4)$$

In other embodiments, a three-dimensional lookup table can be used to perform the color correction step 125.

The color image data is also manipulated by a tone scale correction step 135. In some embodiments, the tone scale correction step 135 can be performed using a one-dimensional look-up table as described in U.S. Pat. No. 5,189,511, cited earlier. In some embodiments, a plurality of tone scale correction look-up tables is stored in the firmware memory 28 in the digital camera 10. These can include look-up tables which provide a "normal" tone scale correction curve, a "high contrast" tone scale correction curve, and a "low contrast" tone scale correction curve. A user selected contrast setting 140 is used by the processor 20 to determine which of the tone scale correction look-up tables to use when performing the tone scale correction step 135.

The color image data is also manipulated by an image sharpening step 145. In some embodiments, this can be provided using the methods described in commonly-assigned U.S. Pat. No. 6,192,162 entitled "Edge enhancing colored digital images" to Hamilton, et al., the disclosure of which is incorporated herein by reference. In some embodiments, the user can select between various sharpening settings, including a "normal sharpness" setting, a "high sharpness" setting, and a "low sharpness" setting. In this example, the processor 20 uses one of three different edge boost multiplier values, for example 2.0 for "high sharpness", 1.0 for "normal sharpness", and 0.5 for "low sharpness" levels, responsive to a sharpening setting 150 selected by the user of the digital camera 10.

The color image data is also manipulated by an image compression step 155. In some embodiments, the image compression step 155 can be provided using the methods described in commonly-assigned U.S. Pat. No. 4,774,574, entitled "Adaptive block transform image coding method and apparatus" to Daly et al., the disclosure of which is incorporated herein by reference. In some embodiments, the user can select between various compression settings. This can be implemented by storing a plurality of quantization tables, for example, three different tables, in the firmware memory 28 of the digital camera 10. These tables provide different quality levels and average file sizes for the compressed digital image file 180 to be stored in the image memory 30 of the digital camera 10. A user selected compression mode setting 160 is used by the processor 20 to select the particular quantization table to be used for the image compression step 155 for a particular image.

The compressed color image data is stored in a digital image file 180 using a file formatting step 165. The image file can include various metadata 170. Metadata 170 is any type of information that relates to the digital image, such as the model of the camera that captured the image, the size of the image, the date and time the image was captured, and various camera settings, such as the lens focal length, the exposure time and f-number of the lens, and whether or not the camera flash fired. In a preferred embodiment, all of this metadata 170 is stored using standardized tags within the well-known Exif-JPEG still image file format. In a preferred embodiment of the present invention, the metadata 170 includes information about camera settings 185.

Figure 3:
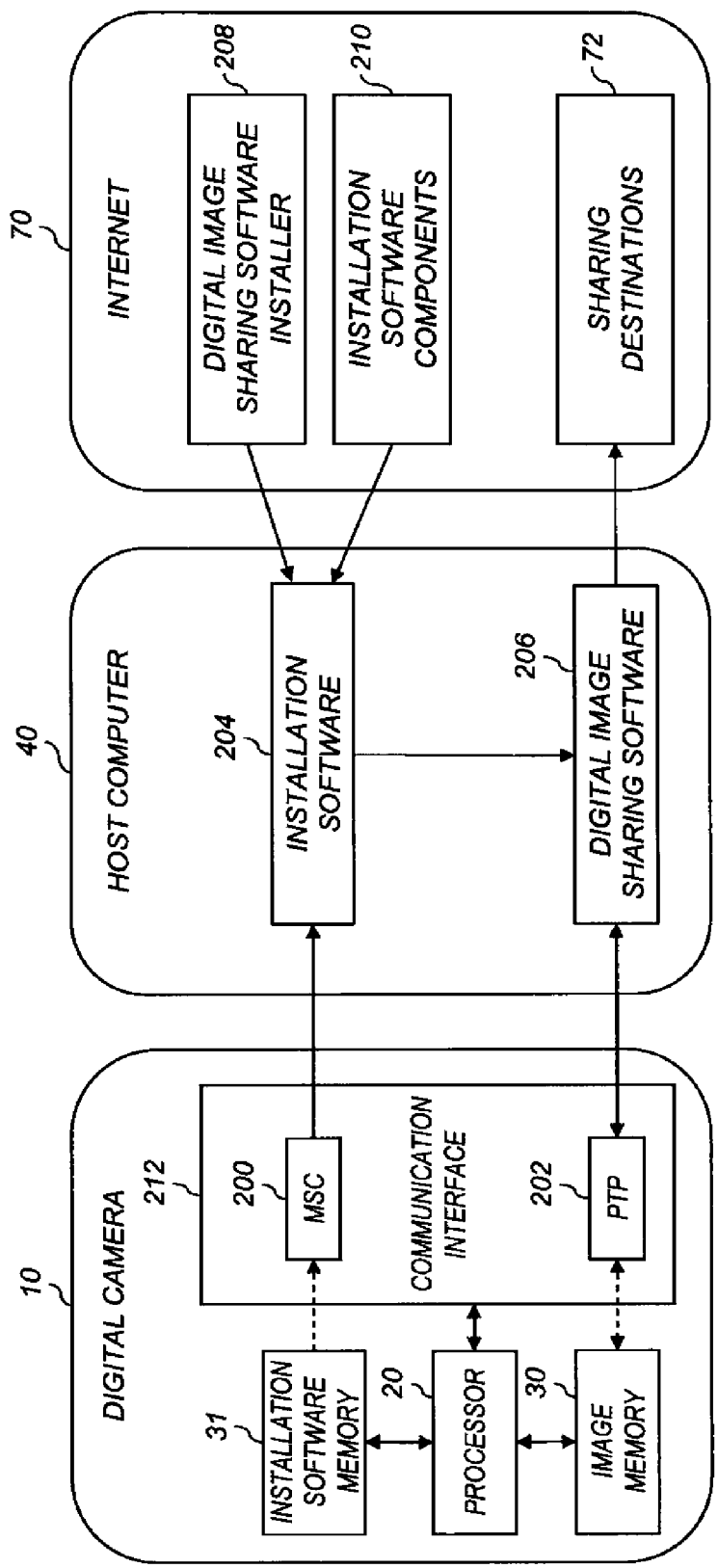
FIG. 3 is a high-level block diagram showing system level components involved in sharing digital images according to the present invention.

FIG. 3 is a high-level block diagram showing system level components involved in sharing digital images according to the present invention. The system includes the digital camera 10, the host computer 40 and the Internet 70. According to the present invention, digital camera 10 enables digital image sharing software 206 to be installed on any host computer 40 without the need for using software installation disks or manually downloading the digital image sharing software 206 from a website. This enables a digital camera user to conveniently transfer and share their digital images (digital still images or digital videos) from any host computer 40.

Once installed, the digital image sharing software 206 is configured to share the digital images with sharing destinations 72 that have been designated by the user in the digital camera 10. For example, the digital images can be designated to be shared with various sharing destinations 72 including an E-mail address, a picture sharing website, a social networking website, a digital picture frame, a multimedia message to a cell-phone or a printing service.

To accomplish this goal, the digital camera 10 has the capability to present multiple logical protocols to the host computer 40. The digital camera 10 includes a communication interface 212. The communication interface 212 can, for example, be the wired interface 38 shown in FIG. 1. In a preferred embodiment of the present invention, the communication interface 212 is a USB wired interface 38. However, any other type of wired interface 38 known in the art can also be used. In alternate embodiments of the present invention, the communication interface 212 can be a wireless interface such as wireless USB.

The communication interface 212 can be can be configured to use a first logical protocol where the digital camera 10 appears to the host computer 40 as a data storage device and a second logical protocol where the digital camera 10 appears to the host computer 40 as an image capture device. In a preferred embodiment, the first logical protocol is a Mass Storage Class (MSC) protocol 200 and the second logical protocol is a Picture Transfer Protocol (PTP) protocol 202. Both the MSC protocol 200 and the PTP protocol 202 are standard logical protocols well-known in the industry.

According to the present invention, the digital camera 10 is configured so that when it is initially connected to the host computer 40, the communication protocol will be set to use the MSC protocol 200. In this mode, the digital camera 10 will appear to the host computer 40 to be a CD-ROM/DVD-ROM drive with enclosed CD/DVD media containing the contents of the installation software memory 31. In a preferred embodiment, the installation software memory 31 includes a file (e.g., an "autorun.inf" script) which automatically runs when the CD-ROM/DVD-ROM drive is connected to the host computer 40. If the digital image sharing software 206 has not been previously installed in the host computer 40, the autorun.inf script causes installation software 204 to be copied from the installation software memory 31 to the host computer 40. The installation software 204 is then run on the host computer 40 in order to install the digital image sharing software 206.

The installation software memory 31 will generally not be large enough to store the complete digital image sharing software 206. Therefore the installation software 204 can be a small software application which is configured to download a digital image sharing software installer 208 from the Internet 70. The installation software 204 can then cause the digital image sharing software installer 208 to run in order to install the digital image sharing software 206.

In some cases, the installation software memory 31 may not even be large enough to store a complete version of the installation software 204. Minimally, the installation software memory 31 contains the autorun.inf file, as well as a small installation software applet that enables the host computer 40 to download additional installation software components 210 from the Internet 70. For example, the installation software components 210 can be JavaScript instructions or other resources necessary for displaying graphical user interface elements on the user interface of the installation software 204. The installation software applet must be able to run even if the host computer 40 is not connected to the Internet 70. However, in this case the installation software applet may not include some features such as graphical user interface elements.

The digital camera 10 can be connected to different types of host computers 40 running different host computer operating systems (e.g., Microsoft Windows and Macintosh OS X). To support installing the digital image sharing software 206 on different host computer operating systems, the installation software memory 31 can contain different versions of the installation software 204 appropriate for each host computer operating system. In this case, the "CD media" can be configured such that the host computer sees only the installation software 204 pertinent for that host computer operating system. There may be certain software components (e.g., user interface resources) that are shared between host computer operating systems to minimize the amount of installation software memory 31 needed to store the installation software 204.

If the digital image sharing software 206 has previously been installed on the host computer 40, the digital image sharing software 206 sends commands to the digital camera 10 to cause the processor 20 to switch the communication interface 212 to use the PTP protocol 202. After the communication interface 212 has been switched to the PTP protocol 202, the digital image sharing software 206 running on the host computer 40 can transfer digital images stored in the image memory 30 to the host computer 40. The digital image sharing software 206 can then direct the host computer 40 to share any digital images that have been designated for sharing with one or more designated sharing destinations 72.

Figure 4:
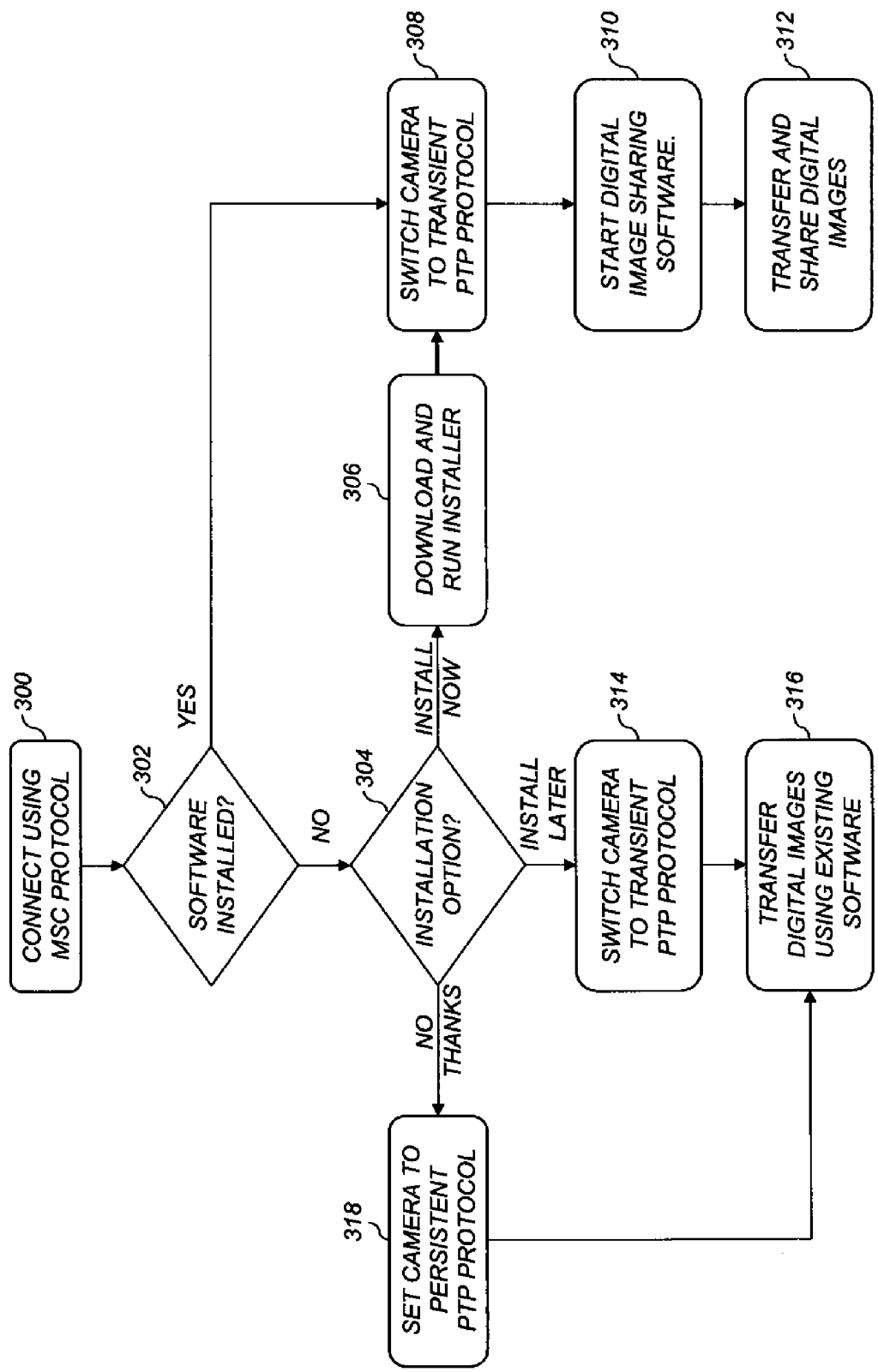
FIG. 4 is a flow chart illustrating a method for transferring and sharing digital images from a digital camera according to the present invention.

FIG. 4 is a flow chart illustrating a method for transferring and sharing digital images from a digital camera 10 according to the present invention. The process starts when the digital camera 10 is connected to the host computer 40, for example by connecting a USB cable between the digital camera 10 and the host computer 40. When the digital camera 10 connects to the host computer 40, it announces itself as a data storage device (i.e., as an MSC protocol device). The host computer 40 then enumerates the digital camera 10 as an MSC device with a connect using MSC protocol step 300.

The behavior of the host computer 40 will depend on whether the digital image sharing software 206 has been previously installed according to a software installed test 302. If this is the first time that the digital camera 10 has been connected to a particular host computer 40, the digital image sharing software 206 will not have been installed on the host computer 40. In this case, the user will be given the opportunity to install the digital image sharing software 206.

The exact mechanism for presenting the option to install the digital image sharing software 206 to the user is somewhat platform specific. On a PC running a Windows XP operating system, the host computer 40 will detect that the "CD-ROM/DVD-ROM drive" contains an "autorun.inf" file, and will generally then automatically execute the instructions in the autorun.inf file (unless the user has configured their host computer 40 to not automatically execute such files). Other Microsoft Windows operating system will exhibit similar behavior. If the user has configured the host computer 40 to not automatically run autorun.inf files, the user can navigate to the executable file for the installation software 204 to initiate the installation process. On a Macintosh OS X computer, the host computer 40 will display a folder containing an icon for the installation software 204. The user can double click on the icon to initiate the installation process.

If the digital image sharing software 206 has been previously installed, a listener will be running on the host computer 40 in the background. The listener determines when the digital camera 10 is connected to the host computer 40. When the listener recognizes that the digital camera 10 has been connected to the host computer 40, the listener takes control and will suppress the actions of the autorun.inf file. The listener then proceeds to switch the digital camera 10 to the PTP protocol using a switch camera to transient PTP protocol step 308. The switch camera to transient PTP protocol step 308 will be discussed in more detail later.

When the installation software 204 is executed, it presents a number of options to the user. In a preferred embodiment, the installation software 204 executes an installation option test 304 by displaying a window including three buttons labeled "Install Now," "Install Later" and "No Thanks." It will be obvious to one skilled in the art that the buttons can be labeled with different wordings, or that only a subset of the buttons can be presented in a particular embodiment.

If the user chooses the "Install Now" option, a download and run installer step 306 is executed by the installation software 204. During this step, the installation software 204 downloads the digital image sharing software installer 208 from the Internet 70. The digital image sharing software installer 208 is then executed to install the digital image sharing software 206.

After installing the digital image sharing software 206, execution proceeds to the switch camera to transient PTP protocol step 308. This step sends a command to the digital camera 10 that causes the digital camera 10 to switch the communication interface 212 to use the PTP protocol 202. In a preferred embodiment, the switch camera to transient PTP protocol step 308 sets a transient flag in the digital camera 10 firmware memory 28 that indicates that the next time the digital camera 10 connects to the host computer 40 it should connect using the PTP protocol 202. The switch camera to transient PTP protocol step 308 then sends a command to the digital camera 10 to initiate a power cycle. When the digital camera 10 powers up, it will establish a new connection to the host computer 40 using the PTP protocol 202. In other embodiments, the digital camera 10 can cause the USB connection to be disconnected and reestablished using some other mechanism rather than requiring the entire digital camera 10 be power cycled. The PTP protocol 202 during this connection is referred to as "transient" because the camera typically will revert to the MSC protocol 200 on a subsequent connection.

When the digital camera 10 is connected to the host computer 40 using the PTP protocol 202, the host computer 40 automatically initiates execution of the digital image sharing software 206 using a start digital image sharing software step 310. This enables the transfer and sharing of digital images via a transfer and share digital images step 312.

In a preferred embodiment, the digital image sharing software 206 gives the user a choice of whether to proceed with the transfer and share digital images step 312. In some embodiments, the transfer and share digital images step 312 proceeds automatically unless the user interrupts the execution within a specified period of time. In one implementation, a countdown timer is shown to the user which counts down from 10 seconds to 0 seconds and the transfer and share digital images step 312 proceeds automatically unless the user stops the operation before the countdown timer reaches 0 seconds.

In some embodiments, the user can also be given the option to modify the sharing destinations 72 that have been specified by the user in the digital camera 10. Modifying the sharing destinations can include adding and deleting sharing destinations 72 for one or more of the digital images.

The digital image sharing software 206 can also provide a mechanism for the user to modify information associated with a particular sharing destination 72. For example, the user can update a username and password associated with a particular picture sharing website or a particular social networking web site.

In some embodiments, the digital image sharing software 206 also provides a mechanism for maintaining an address book of E-mail addresses that the user would commonly like to use as sharing destinations 72. Some recent digital picture frames (e.g., the KODAK PULSE Digital Frame) associate an E-mail address with the digital picture frame. The user can update the digital images stored on the digital picture frame by E-mailing a digital image to the associated digital picture frame E-mail address. Therefore, one convenient way to specify a digital picture frame as a sharing destination 72 is to include the digital picture frame's E-mail address in the address book. When the address book is updated in the digital image sharing software 206, the digital image sharing software 206 can automatically update a corresponding address book in the digital camera 10. If the user updates the address book when the digital camera 10 is not connected to the host computer 40, the digital image sharing software 206 will synchronize the address books the next time the digital camera 10 is connected.

Once initiated, the transfer and share digital images step 312 transfers any shared digital images to the designated sharing destinations 72. For example, if a particular digital image is designated to be shared with a particular E-mail address, an E-mail can be automatically sent including the digital image as an attachment. Similarly, digital images can be E-mailed to cell phones having multimedia messaging capability or E-mail-enabled digital picture frames. Alternately, if the particular digital image is designated to be shared using a picture sharing website or a social networking website, the digital image can be automatically uploaded to the website over the Internet 70.

If the user selects the "Install Later" option at the installation option test 304, installation of the digital image sharing software 206 is postponed and a switch camera to transient PTP protocol step 314 is executed. The operation of this step is equivalent to the switch camera to transient PTP protocol step 308 which has been discussed above. In summary, the switch camera to transient PTP protocol step 314 sends commands to the digital camera 10 to cause it to switch the communication interface 212 to use the PTP protocol 202. The PTP protocol 202 is also set to be "transient" in this workflow such that when the digital camera 10 is subsequently connected to the host computer 40, the installation software 204 will again execute the installation option test 304 to give the user another opportunity to install the digital image sharing software 206.

When the digital camera 10 is set to use the PTP protocol 202 without the digital image sharing software 206, the user will be able to access their digital images using existing software using a transfer digital images using existing software step 316. For example, the user can use Windows Explorer (or Apple Image Capture) to transfer digital images from the digital camera 10 to the host computer 40. Alternately, the user can view or transfer their digital images using other software applications such as Adobe Photoshop, Google Picasa or Apple iPhoto.

If the user selects the "No Thanks" option at the installation option test 304, installation of the digital image sharing software 206 is declined and a set camera to persistent PTP protocol step 318 is executed. This step is similar to the switch camera to transient PTP protocol step 314 except that a persistent mode setting in the digital camera firmware is set to "PTP" so that the digital camera 10 will always enumerate in the PTP protocol 202 when it is connected to any host computer 40. Therefore, the user will not continue to be presented with the option to install the digital image sharing software 206. In some embodiments, the user can use the user controls 34 on the digital camera 10 to modify the persistent mode setting to choose either "PTP" or "MSC" modes. This allows the user to change his mind if he selected the "No Thanks" option but later decides that he would like to install the digital image sharing software 206.

Figure 5:
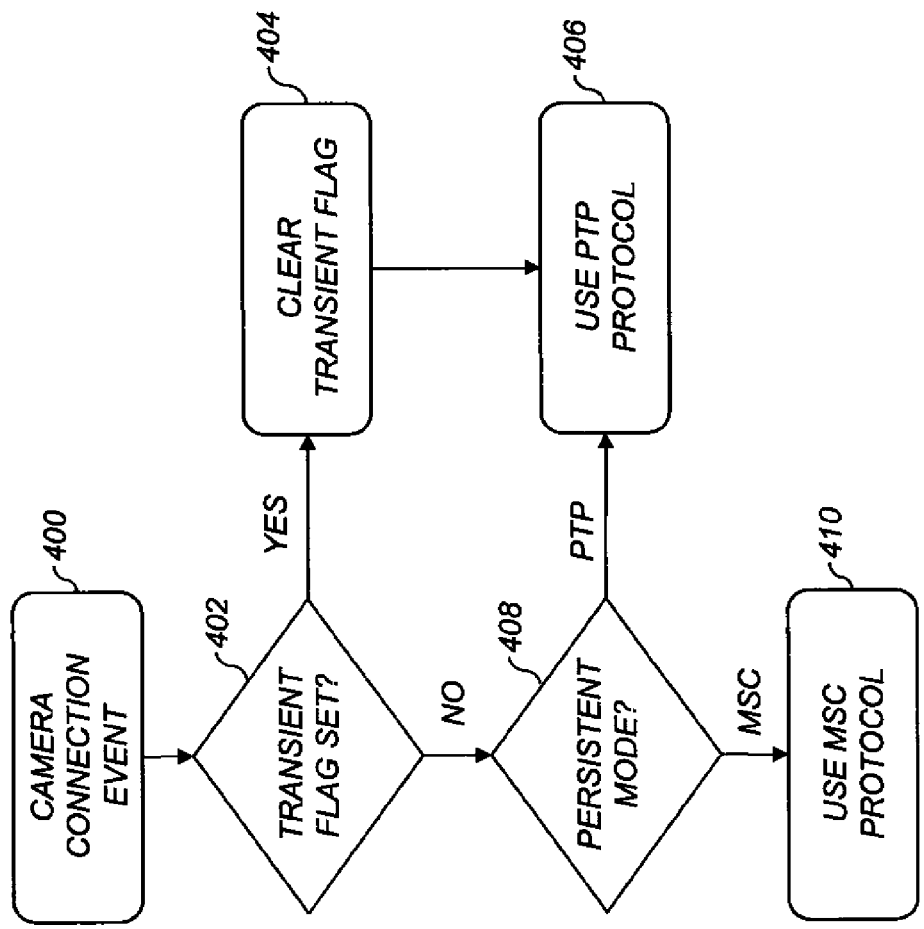
FIG. 5 shows a flow chart illustrating a process for configuring the communication interface in the digital camera.

FIG. 5 shows a flow chart illustrating a process that the digital camera 10 uses to configure the communication interface 212 when connected to a host computer 40. When the digital camera 10 is connected to the host computer 40 (e.g., by connecting a USB cable), a camera connection event 400 is initiated in the digital camera 10. This event initiates the configuration process to determine which communication protocol the digital camera 10 will enumerate to the host computer 40. A transient flag set test 402 examines the value of the transient flag stored in the digital camera firmware memory 28. If the transient flag is set, then a clear transient flag step 404 is executed to clear the transient flag. A use PTP protocol step 406 is then executed which enumerates the digital camera 10 to the host computer 40 using the PTP protocol 202.

In a preferred embodiment, the transient flag is a Boolean variable which can be set to "True" or "False." In other embodiments, the transient flag can be a numerical value representing the number of times that the digital camera should enumerate using the PTP protocol 202. It will be obvious to one skilled in the art that other transient flag mechanisms are also possible.

If the transient flag set test 402 determines that the transient flag is not set, then a persistent mode test 408 is used to determine which communication interface 212 should be used by examining the persistent mode setting in the digital camera firmware. If the persistent mode setting is set to "PTP," then the use PTP protocol step 406 is executed, which enumerates the digital camera 10 to the host computer 40 using the PTP protocol 202. If the persistent mode setting is set to "MSC," then the use MSC protocol step 410 is executed, which enumerates the digital camera 10 to the host computer 40 using the MSC protocol 200. When the digital camera 10 is connected to the host computer 40 using the MSC protocol, the host computer 40 will initiate the process described earlier with respect to FIG. 4 by executing the connect using MSC protocol step 300.

During the connection process, it may be useful to present messages or status information to the user on the user interface (e.g., display screen 32) of the digital camera 10. In a preferred embodiment, the digital camera 10 monitors the information on the MSC interface and presents helpful text to the digital camera user if the installation software 204 does not automatically run. For example, the digital camera 10 can detect whether the host computer 40 is accessing the contents of the "CD/DVD media."

The installation software 204 may not run for a number of different reasons. For example, the installation software 204 will not run if the user has turned the auto-play feature off on the host computer 40. In other cases, the installation software 204 will not run if the digital camera user has plugged the digital camera 10 into a non-host-computer device such as a printer or a digital picture frame.

For the case where the installation software 204 does not automatically run when the digital camera 10 is plugged into the host computer 40 (e.g., when the auto-play feature has been turned off), the informational text presented on the display screen 32 can help the user navigate and run the installation software 204 on the host computer 40. For example, if the digital camera 10 detects that it is connected to a host computer running a Microsoft Windows operating system and that the installation software 204 has not been initiated, informational text can be displayed on the display screen 32 telling the user how to locate and run the installation software 204 on the host computer 40. When the installation software 204 is executed on the host computer 40, the informational text presented on the display screen 32 can be updated accordingly to reflect the change in the status.

For the case where the digital camera 10 is plugged into a printer or some other non-host-computer device, informational text can be displayed on the display screen 32 telling the user to consult the digital camera user guide for information on manually setting the camera to connect using the PTP protocol 202.

The invention has been described in detail with particular reference to certain preferred embodiments thereof, but it will be understood that variations and modifications can be effected within the spirit and scope of the invention.

PARTS LIST 2 flash
4 lens
6 adjustable aperture and adjustable shutter
8 zoom and focus motor drives
10 digital camera
12 timing generator
14 image sensor
16 ASP and A/D Converter
18 buffer memory
20 processor
22 audio codec
24 microphone
26 speaker
28 firmware memory
30 image memory
31 installation software memory
32 display screen
34 user controls
36 display memory
38 wired interface
40 host computer
42 tilt sensor
44 video interface
46 video display
48 interface/recharger
50 wireless modem
52 radio frequency band
58 wireless network
70 Internet
72 sharing destinations
90 white balance setting
95 white balance step
100 color sensor data
105 noise reduction step
110 ISO setting
115 demosaicing step
120 resolution mode setting
125 color correction step
130 color mode setting
135 tone scale correction step
140 contrast setting
145 image sharpening step
150 sharpening setting
155 image compression step
160 compression mode setting
165 file formatting step
170 metadata
175 user settings
180 digital image file
185 camera settings
200 Mass Storage Class (MSC) protocol
202 Picture Transfer Protocol (PTP) protocol
204 installation software
206 digital image sharing software
208 digital image sharing software installer
210 installation software components
212 communication interface
300 connect using MSC protocol step
302 software installed test
304 installation option test
306 download and run installer step
308 switch camera to transient PTP protocol step
310 start digital image sharing software step
312 transfer and share digital image step
314 switch camera to transient PTP protocol step
316 transfer digital images using existing software step
318 set camera to persistent PTP protocol step
400 camera connection event
402 transient flag set test
404 clear transient flag step
406 use PTP protocol step
408 persistent mode test
410 use MSC protocol step

The invention claimed is:
1. A digital camera capable of sharing digital images using a plurality of host computers, comprising:
an imaging sensor;
an optical system for imaging a scene onto the imaging sensor;
an image capture control for initiating an image capture operation;

memory for storing captured digital images and for storing installation software that can be used to install digital image sharing software on the plurality of host computers;

a user interface for designating captured digital images to be shared; and a communication interface for communicating with a host computer, wherein the communication interface can be configured to use a first logical protocol where the digital camera appears to the host computer as a data storage device and a second logical protocol where the digital camera appears to the host computer as an image capture device;

wherein when the digital camera is connected to a host computer the processor causes the communication interface to use the first logical protocol so that the host computer can access the installation software stored in the memory to install the digital image sharing software on the host computer; and wherein when the digital image sharing software is running on the host computer it sends commands to the digital camera to cause the processor to switch the communication interface to use the second logical protocol and subsequently to cause digital images that have been designated for sharing to be transferred to the host computer;

wherein the commands sent to the digital camera to cause the processor to switch the communication interface to use the second logical protocol include:

a command to set a transient mode flag; and a command to power cycle the digital camera;

wherein when the digital camera power cycles, instructions executed by the digital camera set the communication interface to use the second logical protocol in response to detecting that the transient mode flag is set.

2. The digital camera of claim 1 wherein the communication interface is a USB interface.

3. The digital camera of claim 2 wherein the first logical protocol is a mass storage class logical protocol.

4. The digital camera of claim 2 wherein the second logical protocol is a picture transfer protocol.

5. The digital camera of claim 1 wherein the instructions executed by the digital camera clear the transient mode flag after setting the communication interface to use the second logical protocol.

6. The digital camera of claim 1 wherein the installation software gives a user a choice of whether or not to install the digital image sharing software.

7. The digital camera of claim 1 wherein a user can set the digital camera to a persistent mode which causes the communication interface to use the second logical protocol even when the digital image sharing software is not running on the host computer.

8. The digital camera of claim 1 wherein the installation software includes a plurality of executable instructions each associated with a different host computer operating systems.

9. The digital camera of claim 1 wherein the host computer is connected to a network, and wherein the installation software downloads the digital image sharing software from the network to the host computer.

10. The digital camera of claim 1 wherein the host computer is connected to a network, and wherein the installation software is an applet that enables the host computer to download additional installation software components from the network.

11. The digital camera of claim 1 wherein the installation software is automatically executed by the host computer if the digital image sharing software is not currently installed on the host computer.

12. The digital camera of claim 7 wherein the installation software includes an autorun.inf file.

13. The digital camera of claim 1 further including a display screen, and wherein information is presented on the display screen to guide a user to manually initiate execution of the installation software.

14. The digital camera of claim 1 wherein the digital images are digital still images or digital video images.

15. The digital camera of claim 1 wherein the digital image sharing software includes a listener which determines when the digital camera is connected to the host computer.

16. The digital camera of claim 1 wherein the user interface enables a user to designate one or more sharing destinations for captured digital images.

17. The digital camera of claim 13 wherein the digital image sharing software directs the host computer to transfer the designated captured digital images to the one or more designated sharing destinations.

18. The digital camera of claim 13 wherein the one or more sharing destinations include an E-mail address, a picture sharing website, a social networking website, a digital picture frame, a multimedia message to a cell-phone or a printing service.

* * * * *